(12) United States Patent
Mahdjoubi Namin et al.

(10) Patent No.: US 12,134,568 B2
(45) Date of Patent: Nov. 5, 2024

(54) WATER DISTRIBUTION UNIT FOR WATER RECIRCULATION SYSTEM

(71) Applicant: ORBITAL SYSTEMS AB, Malmö (SE)

(72) Inventors: Amir Mehrdad Mahdjoubi Namin, Malmö (SE); Michael Ridell, Staffanstorp (SE)

(73) Assignee: ORBITAL SYSTEMS AB, Malmo (SE)

( * ) Notice: Subject to any disclaimer, the term of this patent is extended or adjusted under 35 U.S.C. 154(b) by 474 days.

(21) Appl. No.: 17/298,010

(22) PCT Filed: Nov. 14, 2019

(86) PCT No.: PCT/SE2019/051152
§ 371 (c)(1),
(2) Date: May 27, 2021

(87) PCT Pub. No.: WO2020/112002
PCT Pub. Date: Jun. 4, 2020

(65) Prior Publication Data
US 2022/0089458 A1    Mar. 24, 2022

(30) Foreign Application Priority Data
Nov. 28, 2018    (SE) .................................. 1851477-8

(51) Int. Cl.
*C02F 1/00*    (2023.01)
*C02F 1/02*    (2023.01)
(Continued)

(52) U.S. Cl.
CPC .............. *C02F 1/006* (2013.01); *C02F 1/008* (2013.01); *C02F 9/00* (2013.01); *E03C 1/126* (2013.01);
(Continued)

(58) Field of Classification Search
None
See application file for complete search history.

(56) References Cited

U.S. PATENT DOCUMENTS

| 4,115,879 A | 9/1978 | Toms |
| 4,228,006 A | 10/1980 | Hanna |

(Continued)

FOREIGN PATENT DOCUMENTS

| CN | 2926333 Y | 7/2007 |
| DE | 3618186 A1 | 1/1987 |

(Continued)

OTHER PUBLICATIONS

International Search Report for PCT/SE2019/051152 dated Oct. 1, 2021.

*Primary Examiner* — Krishnan S Menon
(74) *Attorney, Agent, or Firm* — MOSER TABOADA

(57) ABSTRACT

The present invention describes a system (1) enabling treating water from a water tank (3), which water tank (3) is arranged in a water distribution architecture also comprising one or more user units (8), said system (1) also enabling recycling of water or discarding of water not suitable to recycle, said system (1) comprising a water distribution unit (2), at least one water treating unit (6) and a sensor unit (7) arranged for measurement of at least water quality, said water distribution unit (2) comprising one common user unit inlet 9 connectable via piping to said one or more user units (8) on their used water output side; said water distribution unit (2) further comprising a contaminated water outlet (10); and said water distribution unit (2) further comprising at least one water recirculation port (1000) connectable via piping to the water tank (3) to enable flowing water between the water distribution unit (2) and the water tank (3); and wherein said at least one water treating unit (6) enables to treat water to increase the water quality thereof and where (Continued)

the sensor unit (7) is connected to a control unit, which, based on the measurement of the water quality, is arranged to decide if water should be recycled to the water tank (3) from the water distribution unit (2) or should be discarded via the contaminated water outlet (10) from the water distribution unit (2).

5 Claims, 1 Drawing Sheet

(51) Int. Cl.
    *C02F 1/32*     (2023.01)
    *C02F 9/00*     (2023.01)
    *C02F 103/00*     (2006.01)
    *E03C 1/126*     (2006.01)
    *E03F 5/18*     (2006.01)

(52) U.S. Cl.
    CPC ................ *E03F 5/18* (2013.01); *C02F 1/001* (2013.01); *C02F 1/02* (2013.01); *C02F 1/32* (2013.01); *C02F 2103/002* (2013.01); *C02F 2301/046* (2013.01); *E03C 2201/40* (2013.01)

(56) References Cited

U.S. PATENT DOCUMENTS

| | | | |
|---|---|---|---|
| 4,828,709 | A | 5/1989 | Houser et al. |
| 6,887,375 | B2 | 5/2005 | Johnson |
| 2011/0289672 | A1* | 12/2011 | Cummings ............... E03B 1/04 4/603 |
| 2014/0033422 | A1 | 2/2014 | Christy |
| 2015/0344323 | A1* | 12/2015 | Mahdjoubi Namin ..................... A47K 3/281 210/86 |
| 2016/0319522 | A1* | 11/2016 | Sparre ....................... E03C 1/00 |
| 2018/0201516 | A1 | 7/2018 | Mahdjoubi |

FOREIGN PATENT DOCUMENTS

| | | |
|---|---|---|
| FR | 2974285 | 4/2019 |
| GB | 2497264 A | 6/2013 |
| WO | WO-94/05866 | 3/1994 |
| WO | WO-2017099663 A1 | 6/2017 |
| WO | WO-2018/097790 A1 | 5/2018 |

\* cited by examiner

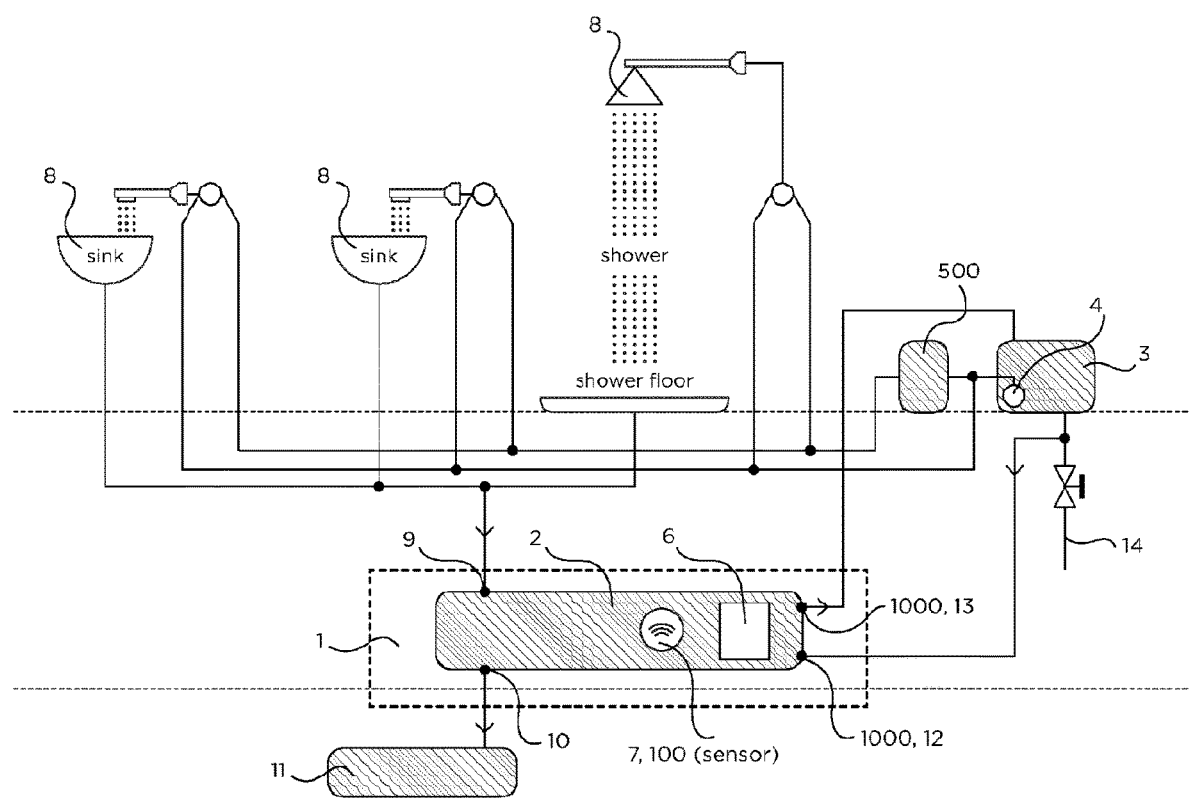

WATER DISTRIBUTION UNIT FOR WATER RECIRCULATION SYSTEM

FIELD OF THE INVENTION

The present invention relates to a water distribution unit for water recirculation systems.

TECHNICAL BACKGROUND

Water recirculation systems are known. One example, in the form of a shower, is disclosed in WO 2013/095278 which describes a hybrid device for a recirculation shower, allowing purification and either recycling of water or discarding of water, where said hybrid device comprises a recirculation loop, a filter system with a nano-filter, and at least one filter quality sensor, and wherein the hybrid device is arranged to redirect the water from recirculation to drainage when the at least one filter quality sensor indicates the need thereof. The device disclosed in WO 2013/095278 comprises a so called modified drain which collects the water used and facilitates the stream of water towards the recycling loop and filter system or towards drainage. In one embodiment of the WO 2013/095278, the modified drain comprises at least one sensor, indicating the water quality, as mentioned above, and wherein the hybrid device is arranged to redirect the water from recirculation to drainage when the at least one water quality sensor indicates the need thereof.

The present invention is directed to a water distribution unit for water recirculation systems. The water distribution unit according to the present invention, similar to the modified drain according to WO 2013/095278, has the ability of directing water to waste or to recirculation. The water distribution unit according to the present invention, however, is intended as a plug-in device in the architecture of water distribution and recirculation systems. One aim of the present invention is to provide a water distribution unit both providing the possibility of directing water either to recirculation or waste, and at the same time provide other water distribution capabilities in water distribution and recirculation systems.

SUMMARY OF THE INVENTION

The stated purpose above is achieved by a system enabling treating water from a water tank, which water tank is arranged in a water distribution architecture also comprising one or more user units, said system also enabling recycling of water or discarding of water not suitable to recycle, said system comprising a water distribution unit, at least one water treating unit and a sensor unit arranged for measurement of at least water quality, said water distribution unit comprising one common user unit inlet connectable via piping to said one or more user units on their used water output side;
said water distribution unit further comprising a contaminated water outlet; and said water distribution unit further comprising at least one water recirculation port connectable via piping to the water tank to enable flowing water between the water distribution unit and the water tank; and wherein said at least one water treating unit enables to treat water to increase the water quality thereof and where the sensor unit is connected to a control unit, and based on the measurement of the water quality, is arranged to decide if water should be recycled to the water tank from the water distribution unit or should be discarded via the contaminated water outlet from the water distribution unit.

As may be understood from above, the water distribution unit according to the present invention may also be seen as a water selection unit. The water distribution unit according to the present invention has both capabilities, that is both the feature of providing either discarding of water or recirculation of water when the user units are in operation and depending on the indication of the sensor unit with regards to water quality, and also the feature of flowing water to the water tank or receiving water from the water tank when the operation system is in operation mode therefore. As an example, when the user units are not in operation and the water tank is filled with water, this water may be flown to the distribution unit to enable treatment of the water in the water treating unit to increase the water quality and then flown back to the water tank. As such, a high water quality of the water in the water tank may be obtained. The water in the water tank may then be used in an optimal way in a sink, or shower, or both such user units without the need of sending the water to waste unit the sensor units indicate the need thereof. As water quality quickly decreases, also when only being contained in tanks at room temperature or the like, the present invention provides a solution to ensure to treat and reuse such water until the sensor unit indicates the need to send water to waste, i.e. a grey water tank. As understood, the contaminated water flown out from the contaminated water outlet may be flown to a grey water tank collecting this low water quality fraction.

The flowing of water between the water distribution unit and water tank may be performed in different ways. According to one embodiment of the present invention, there is only one main direct piping line provided between the water distribution unit and the water tank. In such a case an operation system controls which way water is flown. The water distribution unit first receives a water batch, treats it and then sends it back to the water tank. As understood from below, according to the another embodiment, the water distribution unit comprises both an inlet and an outlet intended for flowing water between the water distribution tank and water tank. Therefore, according to another specific embodiment of the present invention, said at least one water recirculation port is two ports being a water recirculation outlet connectable via piping to the water tank and a water feed inlet connectable via piping to the water tank and/or to a fresh water inlet of the water distribution architecture. As understood, the water feed inlet may receive both water from the water tank directly or cold fresh water, or a combination of these when being mixed before flown to the water distribution unit. If only one recirculation port is provided, then the system as a whole must enable to direct the flow in opposite directions in one and the same pipe.

The present invention provides a plug-in system and/or water distribution unit for a water distribution architecture, such as a water distribution architecture in a recreation vehicle or in a house or hotel etc. The present invention provides several benefits in comparison to the existing solutions today. First of all, the present invention enables treatment of water for reuse of the water without the need of extensive rebuilding of existing units in the water distribution architecture, such as user units, water tanks etc. etc. Fact is that the present invention provides a possibility to combine existing architecture with the plug-in system or water distribution unit in a very effective way.

Secondly, the present invention enables the usage of both the pump effect and the heating effect in an optimal way. There is no need to double up with another pump or implement an extra heating system when implementing the system according to the present invention.

Furthermore, the present invention enables a simple and inexpensive way for maintaining, treating and sterilizing water in a water tank/water supply of a water distribution architecture. Moreover, the total volume capacity of the overall system is increased without implementing a larger water tank volume or extra water tanks. The volume flow of low water quality per time unit to the grey water tank is also decreased as only the lowest quality water is flown to the great water tank.

SPECIFIC EMBODIMENTS OF THE INVENTION

Below some other specific embodiments of the present invention are presented and discussed further.

According to one specific embodiment of the present invention, the system is a plug-in solution for a water distribution architecture comprising one or more user units, a water tank intended for water usage, a pump, a heating source and a grey water tank, by means of said water distribution unit comprising one common user unit inlet connectable via piping to said one or more user units on their used water output side;

said water distribution unit further comprising a contaminated water outlet connectable via piping to the grey water tank;

said water distribution unit further comprising a water recirculation outlet connectable via piping to the water tank; and said water distribution unit further comprising a water feed inlet connectable via piping to the water tank and/or to a fresh water inlet of the water distribution architecture;

and wherein said at least one water treating unit enables to treat water to increase the water quality thereof and wherein the sensor unit is connected to a control unit, and based on the measurement of the water quality, decides if water may be recycled to the water tank from the water distribution unit or should be discarded and sent to the grey water tank from the water distribution unit.

Regarding the heating source it should be understood that this part may only be part of the full architecture and thus not part of the system according to the present invention. Moreover, the heating source used in the entire architecture may be of different types. According to one specific embodiment, the heating source is a boiler connected to the water tank and enabling to heat water being flown from the water tank to the one or more user units. It should be understood that any type of heating system may be possible to use according to the present invention.

Furthermore, the system according to the present invention may also comprise one or more heating sources, also in combination with heating sources in the total architecture which are not part of the direct system according to the present invention. Thus, also combined heating systems using several heating sources are possible. Therefore, according to one specific embodiment, the system comprises one first heating source and wherein the architecture or system also comprises a second heating source. This second heating source may be part of the architecture as such, e.g. a boiler connected to the water tank, or may be an integrated part in the water recirculation system and thus be a direct part of the system according to the present invention. According to yet another embodiment, two heating sources are used, and where one of them is a heat exchange arrangement. Such heat exchange arrangement may be provided directly in the water distribution unit so that a water flow sent to waste (the grey water tank), which is tempered, is heat exchanged against cold fresh water, a water flow from the water tank or a combination thereof. This heat exchanging may be performed in the water distribution unit.

Another heating solution possible is to incorporate a heat exchange arrangement in connection to the water treating unit. As an example, the water treating unit may be a light unit, e.g. a UV lamp or LED unit(s). In such a case, the light unit may be provided inside of a vessel and wherein the heat exchange arrangement may be arranged as a jacket of this vessel. In such a case an external heating source may provide the energy, suitably in the form of hot water, to this jacket for heating. Some external heating sources are mentioned below, such as a LPG heater or solar panels.

The water treating unit according to the present invention may also be of different types. According to one embodiment, the treating unit is in fact several units, e.g. one or more filter units combined with a light unit, e.g. a UV unit. Moreover, and as understood from above, the UV unit may be provided in a combined UV and heating unit. In this regard it should also be noted that a filter is optional according to the present invention. Moreover, a rough filter may be arranged at another position in the device, while the actual water treatment unit in fact is a UV unit, or e.g. a combined UV unit and heater, it another type of water treating unit.

The user units in the water distribution architecture or main system may be of different type. According to one embodiment, the one or more user units is one shower and at least one sink. The water distribution architecture comprising a one or more user units, a water tank intended for water usage, a pump, a heating source and a grey water tank may be used in different technical applications. According to one embodiment of the present invention such water distribution architecture is implemented in a recreation vehicle (RV), and the present invention is integrated in the water distribution architecture in the recreation vehicle. In a recreation vehicle it may be one or more sinks being the user units. Furthermore, a shower unit may also be one of the user units.

According to yet another specific embodiment of the present invention, the one or more user units is connected to the water tank via piping both on a cold water side and on a hot water side.

The water distribution unit may have different features and advantages. According to one specific embodiment of the present invention, the contaminated water outlet connectable via piping to the grey water tank of the water distribution architecture is operated by gravitational force. This implies that the plug-in system according to the present invention may be incorporated positioned just above a grey water tank, e.g. in a recreation vehicle.

According to yet another specific embodiment of the present invention, said at least one water treating unit is arranged inside of the water distribution unit. As an example, a filter unit may be arranged inside of the water distribution unit. It should be noted that the water treating unit in fact may in fact be a system comprising several units. For instance, a filter unit arranged inside of the water distribution unit may be combined with a heater and/or UV unit which are provided outside of the water distribution unit. Any type of combination is possible according to the present invention. As hinted above, according to one embodiment of the present invention, said at least one water treating unit is combined with a filter. This filter may be a pre-filter positioned before another type of water treating source, such as e.g. UV or LED light unit, or a combined heater and UV/LED light unit. Moreover, the water treating unit may also only be a light unit. Therefore, according to one embodiment, said at least one water treating unit comprises a light unit, such as e.g. a UV light/UV lamp or LED light. Again, it should be noted that a filter is optional according to the present invention.

The sensor units may depend on what type of water treating unit is implemented in the system. For instance, if a UV light is arranged in the system, then a UV sensor unit is suitable. This UV sensor unit may then function as a functionality sensor for the UV unit. Moreover, the sensor unit should also enable to measure on the water quality so that the control unit can decide if water should be recirculated or sent to waste or a grey water tank. As should be understood from above, the sensor unit may in fact be a sensor system comprising several sensors. One type of sensor unit possible to use is conductivity sensors, e.g. electrical conductivity (EC) sensors. Another possible type is any type of image sensor, such as a camera. What is important is that the water quality sensor can detect one or more parameters which indicate water quality. Also combinations of several such units are possible. Moreover, the same type of sensors may be used for different reasons. For instance, conductivity sensors can function as water quality sensors but also level sensors or the like. Several such sensor units may be incorporated in a system according to the present invention, and may be used for different reasons. Furthermore, a water quality sensor in the form of a conductivity sensor can be combined with a UV sensor or the like. Moreover, a water quality sensor may also be combined with a functionality sensor for the water treating unit. For instance, one or more conductivity sensors may be combined with a UV sensor. Another alternative is to combine an image sensor with a UV sensor.

According to one specific embodiment of the present invention, at least one sensor of the sensor unit is arranged inside of the water distribution unit. Such a sensor or several sensors may be arranged to measure the water quality and or water level, e.g. both for indicating low level or high level.

Also other components are of course possible and may be part of the water distribution unit. According to one specific embodiment of the present invention, the water distribution unit comprises a pump enabling to pump treated water from the water distribution unit and out from the water recirculation outlet and to the water tank. As an example, such a pump may be important to enable to pump water through a filter unit arranged inside of the water distribution unit. A pump with direct connection to the water tank may also be connected to the system according to the present invention.

The present invention is also directed to a method for using a system according to above. Therefore, according to one embodiment, the present invention refers to a method comprising using a system according to the present invention, for flowing water from a water tank of a water distribution architecture to the water distribution unit of the system to enable water treatment to increase the water quality. Moreover, as mentioned, the water distribution unit may also be seen as selection unit. In line with this, according to one embodiment, the method also involves for a control unit to perform a decision if water should be recycled to the water tank from the water distribution unit or should be discarded and sent to the grey water tank from the water distribution unit in connection to usage of said one or more user units. According to one embodiment, the water is flown from the water tank to the water distribution unit by means of gravitational force. In e.g. a recreation vehicle, an existing drain function from the water tank may be utilized to be able to collect water from a lowest point.

The method according to the present invention may also involve operation steps. According to one specific embodiment of the present invention, the water distribution unit operates by a pre-defined water measurement, and optionally water treating, recirculation sequence for water flowing from and to the water tank from the water distribution unit when the one or more user units are not in operation. This implies that when the user units are not in operation, then the water quality is measured. If needed, the water is treated in the water treating unit. Moreover, the sequence implies that water is flown back and forth from the water distribution tank and water tank to ensure a sufficient water quality in the water tank. This method may e.g. be applied in an automatic mode in a recreation vehicle or the like.

The present invention also refers to a water distribution unit intended as a plug-in solution for a water distribution architecture comprising one or more user units, a water tank intended for water usage, a pump, a heating source and a grey water tank, and intended in a water recirculation system incorporated in the water distribution architecture, wherein the water recirculation system comprises at least one water treating unit enabling treatment of water to increase the water quality thereof and a sensor unit arranged for measurement of at least water quality, by means of:

said water distribution unit comprising one common user unit inlet connectable via piping to said one or more user units on their used water output side;

said water distribution unit further comprising a contaminated water outlet connectable via piping to the grey water tank;

said water distribution unit further comprising a water recirculation outlet connectable via piping to the water tank;

and said water distribution unit further comprising a water feed inlet connectable via piping to the water tank and/or to a fresh water inlet of the water distribution architecture;

wherein the sensor unit is connected to a control unit, and based on the measurement of the water quality, is arranged to decide if water should be recycled to the water tank from the water distribution unit or should be discarded via the contaminated water outlet from the water distribution unit.

The water distribution unit disclosed above is very suitable to incorporate in the water distribution system and architecture in e.g. a recreation vehicle. The water distribution unit according to the present invention may comprise any features hinted above when referring to the water distribution and recirculation system. Therefore, all embodiments disclosed above, when relevant in this regard, are also valid for the single water distribution unit according to the present invention.

DETAILED DESCRIPTION OF THE DRAWINGS

In FIG. 1 there is shown one specific embodiment according to the present invention. This embodiment relates to a system 1 which is arranged as a part of water distribution architecture, where the water distribution architecture represent the entire overall system shown in FIG. 1. This water distribution architecture or overall system may be the water distribution architecture of a recreation vehicle (RV). In the embodiment of the system 1 according to the present, which boundaries in this case are shown by the dotted rectangle comprises the water distribution unit 2. According to this embodiment, a water treating unit 6, which may be of different type, such as a UV unit or combined UV and heater unit or something else and a sensor unit 7 are direct parts of the water distribution unit 2. It should be noted that both the water treating unit 6 and the sensor unit 7 may be arranged outside of the water distribution unit 2, however at least one sensor unit 7 is part of the system 1 according to the present invention. In this case, at least one sensor 100 of the sensor unit 7 is arranged inside of the water distribution unit 2. Furthermore, it should also be said that the system 1 according to the present invention may comprise other sensors also being part of the sensor unit 7, however arranged at different positions, e.g. a sensor located on the common user unit inlet 9. Moreover, the water treating unit 6 may in fact have several components at different positions, such as a subsequent combined UV and heater unit. Moreover, one or more filter units may also be arranged in the system.

The water distribution unit 2 also comprises one common user unit inlet 9. This common user unit inlet 9 is connectable to one or more user units 8 which may or may not be a direct part of the system 1 according to the present invention. Regardless, they are components of the overall water distribution architecture system. These user units 8 may e.g. be one or several showers and/or one or more sinks or a combination of these. Furthermore, the water distribution unit 2 also comprises a contaminated water outlet 10, which in this specific case is connectable to a grey water tank 11. This grey water tank 11 is also a component of the overall water distribution architecture system. Moreover, the water distribution unit 2 comprises at least one water recirculation port 1000 connectable a water tank 3 of the overall water distribution architecture system to enable flowing water between the water distribution unit 2 and the water tank 3. This recirculation port 1000 may be provided as only one inlet/outlet where the direction of the flow may be set based on if water should be flown from the water distribution unit 2 to the water tank 3 or the other way around. According to this specific embodiment, however, there are provided two different recirculation ports 1000, which are one water recirculation outlet 12 from where water may be fed from the water distribution unit 2 to the water tank 3 and one water feed inlet 13 from where water may be fed to the water distribution unit 2 from the water tank 3. Moreover, in this case the water feed inlet 13 is also connectable to a fresh water inlet 14 with a connected valve being part of the overall water distribution architecture.

As notable in FIG. 1, there is a pump provided inside of the water tank 3. This pump may instead be arranged at a different position in the overall water distribution architecture. Fact is that a pump may instead be part of the system 1 according to the present invention.

The system according to the present invention may be regarded as a possible plug in-unit in an overall water distribution architecture or system, e.g. in a recreation vehicle. The overall water distribution architecture or system according to the present invention may, in addition to the system according to the present invention, comprise one or several user units 8, a water tank 3 comprising a pump 4 in this case (the pump may of course be provided at other positions in the water distribution architecture), a grey water tank 11, a fresh water inlet 14 and a heating source 500, such as a water heater or boiler 500. The heating source 500 may also be of other types. Examples are such incorporating water-water heating, where the heating medium in form of water is heated from an external heating sources, such as a LPG heater or solar panels or the like.

Furthermore, the heating source 500 may also incorporate other features. One example is water treating capabilities. Therefore, according to one embodiment of the present invention this heating source 500 may be part of a water treating unit 6 according to the present invention, e.g. in a combined UV and heater unit.

It should be noted that an overall water distribution architecture according to the present invention comprises at least a water tank 3, some kind of heating source 500, at least one user unit 8 and a water driving unit, e.g. a pump. It should, however, be noted that the water tank 3 could be seen as a general water supply reservoir for some applications. Regardless, the system 1 according to the present invention may function as a plug-in in a water distribution architecture where water may be continuously treated to increase the water quality so that water may be reused and recirculated and so that only a minimal amount of water, real low water quality, is sent to a grey water tank or grey water collecting unit.

The invention claimed is:

1. A system enabling treating water, said system being a part of a water distribution architecture comprising a water tank and one or more user units, wherein the water tank enables treating water, said system also enabling recycling of water or discarding of water not suitable to recycle, said system comprising:
   a water distribution unit;
   at least one water treating unit; and
   a sensor unit configured to measure at least water quality,
   wherein said water distribution unit comprises:
      one common user unit inlet connectable via piping to said one or more user units on their used water output side;
      a contaminated water outlet;
      and at least one water recirculation port connectable via piping to the water tank to enable flowing water between the water distribution unit and the water tank, said at least one water recirculation port is two ports being a water recirculation outlet connectable via piping to the water tank and a water feed inlet connectable via piping to the water tank and/or to a fresh water inlet of the water distribution architecture,
   wherein said at least one water treating unit is configured to treat water to increase the water quality thereof,
   wherein the sensor unit is connected to a control unit, which, based on the measurement of the water quality, is configured to decide if water should be recycled to the water tank from the water distribution unit or should be discarded via the contaminated water outlet from the water distribution unit,
   wherein the system is a plug-in solution for the water distribution architecture, which further includes a pump, a heating source and a grey water tank, wherein:
   said contaminated water outlet is connectable via piping to the grey water tank;
   and said water distribution unit comprising a water feed inlet connectable via piping to the water tank and/or to a fresh water inlet of the water distribution architecture;
   and wherein the control unit, based on the measurement of the water quality, decides if water should be recycled to the water tank from the water distribution unit or should be discarded and sent to the grey water tank from the water distribution unit,
   wherein the system is connectable to the water distribution architecture, and wherein the heating source is a boiler connected to the water tank and enabling to heat water flowing from the water tank to the one or more user units, and wherein the contaminated water outlet connectable via piping to the grey water tank of the water distribution architecture is operated by gravitational force, wherein the one or more user units includes one shower and at least one sink, wherein said at least one water treating unit is arranged inside of the water distribution unit, wherein at least one sensor of the sensor unit is arranged inside of the water distribution unit, and wherein the water distribution unit comprises a pump configured to pump treated water from the water distribution unit and out from the water recirculation port to the water tank.

2. The system according to claim 1, wherein said at least one water treating unit is combined with a filter.

3. The system according to claim 1, wherein said at least one water treating unit comprises a light unit.

4. The system according to claim 3, wherein the light unit is a UV light.

5. A water distribution unit configured as a plug-in solution for a water distribution architecture comprising one or more user units, a water tank for water usage, a pump, a heating source, and a grey water tank, wherein the water distribution unit is configured for use in a water recirculation system incorporated in the water distribution architecture, and wherein the water recirculation system comprises at least one water treating unit enabling treatment of water to increase the water quality thereof and a sensor unit arranged for measurement of at least water quality, said water distribution unit comprising:

one common user unit inlet connectable via piping to said one or more user units on their used water output side;

a contaminated water outlet connectable via piping to the grey water tank;

a water recirculation port connectable via piping to the water tank; and a water feed inlet connectable via piping to the water tank and/or to a fresh water inlet of the water distribution architecture, wherein the sensor unit is connected to a control unit, which, based on the measurement of the water quality, is configured to decide if water should be recycled to the water tank from the water distribution unit or should be discarded via the contaminated water outlet from the water distribution unit, wherein said water recirculation port is two ports being a water recirculation outlet connectable via piping to the water tank and a water feed inlet connectable via piping to the water tank and/or to a fresh water inlet of the water distribution architecture, wherein the water recirculation system is connectable to the water distribution architecture, wherein the heating source is a boiler connected to the water tank and configured to heat water flowing from the water tank to the one or more user units, and wherein the contaminated water outlet connectable via piping to the grey water tank of the water distribution architecture is operated by gravitational force, wherein the one or more user units includes one shower and at least one sink, wherein said at least one water treating unit is arranged inside of the water distribution unit, wherein at least one sensor of the sensor unit is arranged inside of the water distribution unit, and wherein the water distribution unit comprises a pump configured to pump treated water from the water distribution unit and out from the water recirculation port to the water tank.

* * * * *